United States Patent
Borsuk et al.

(10) Patent No.: US 6,933,683 B2
(45) Date of Patent: Aug. 23, 2005

(54) MICROWAVE POWERED LAMPHEAD HAVING EXTERNAL SHUTTER

(75) Inventors: James M. Borsuk, Westlake, OH (US); Edward C. McGhee, Amherst, OH (US)

(73) Assignee: Nordson Corporation, Westlake, OH (US)

( * ) Notice: Subject to any disclaimer, the term of this patent is extended or adjusted under 35 U.S.C. 154(b) by 18 days.

(21) Appl. No.: 10/771,941

(22) Filed: Feb. 4, 2004

(65) Prior Publication Data

US 2004/0183481 A1 Sep. 23, 2004

Related U.S. Application Data

(60) Provisional application No. 60/450,308, filed on Feb. 27, 2003.

(51) Int. Cl.[7] ................................................ H05B 41/24
(52) U.S. Cl. ........................ 315/248; 315/112; 315/344; 315/39.51
(58) Field of Search ........................ 315/248, 39, 39.51, 315/344, 112, 111.01, 117, 118; 250/493.1; 313/22, 35, 45

(56) References Cited

U.S. PATENT DOCUMENTS

| | | | | |
|---|---|---|---|---|
| 4,695,757 A | * | 9/1987 | Ury et al. | 315/112 |
| 5,471,109 A | * | 11/1995 | Gore et al. | 313/22 |
| 5,838,108 A | * | 11/1998 | Frank et al. | 315/39 |
| 6,657,206 B2 | * | 12/2003 | Keogh et al. | 250/504 R |
| 6,690,112 B2 | * | 2/2004 | Wood et al. | 315/39.51 |
| 6,805,010 B2 | * | 10/2004 | Kuhnt et al. | 73/756 |

* cited by examiner

Primary Examiner—Thuy V. Tran
Assistant Examiner—Ephrem Alemu
(74) Attorney, Agent, or Firm—Wood, Herron & Evans, L.L.P.

(57) ABSTRACT

A microwave powered lamp head assembly includes a shutter assembly which may be activated to selectively allow transmission of light from the microwave powered lamp bulb. The shutter assembly allows unrestricted airflow when it is in the closed position so that the active lamp bulb may still be cooled, while preventing the transmission of UV radiation through the shutter. The shutter assembly is in close sealing relation with respect to the optical cavity holding the lamp bulb when in the closed position to minimize the escape of UV radiation.

9 Claims, 1 Drawing Sheet

MICROWAVE POWERED LAMPHEAD HAVING EXTERNAL SHUTTER

CROSS REFERENCE TO RELATED APPLICATIONS

This application claims the benefit of U.S. Provisional Application No. 60/450,308, filed Feb. 27, 2003, the disclosure of which is hereby incorporated by reference herein in its entirety.

FIELD OF THE INVENTION

The present invention relates generally to microwave powered UV lamps used for curing various materials by photopolymerization and, more specifically, to manners of quickly cycling the devices between active and inactive states.

BACKGROUND OF THE INVENTION

Ultraviolet radiation or UV radiation is often used to photochemically polymerize or cure various types of materials on substrates and may be used in other applications. Existing technology for performing this type of polymerization usually comprises either an electrode-powered ultraviolet lamp or a microwave-powered ultraviolet lamp. The electrode or microwave power is dissipated in a plasma-filled lamp bulb. The plasma radiates light at the desired wavelength or wavelengths and the light is typically reflected or otherwise focused on the intended target to achieve the most efficient transmission.

Microwave powered lamp assemblies generally are much more powerful than electrode powered assemblies and emit much higher UV radiation from the plasma-filled bulb. Several hundred watts of microwave power may be absorbed by the plasma in a relatively small volume. Some of this microwave power is converted to heat and, therefore, the plasma-filled bulb must be cooled in some manner to prevent overheating and promote long bulb life. Typically, cooling is achieved by circulating air over the lamp bulb. Since the microwave powered lamps generate more intense UV radiation, safety is also a concern since exposure to such radiation may raise health concerns. Finally, while microwave powered lampheads are faster to cycle on and off than electrode powered lampheads, they may still not cycle on and off quickly enough to achieve a desired production speed. In this regard, some photopolymers may have short activation periods and, therefore, it would be desirable to cycle the bulb on and off within a short period of time, for example, of several seconds or less. In a high production environment, it may also be desirable to reactivate the lamp bulb for the next curing operation on an assembly line, for example, within a very short period of time. Unfortunately, even microwave powered lampheads take time to reach full power after they have been deactivated or turned off. This time period to power up the lamp may take several seconds or more and this may be unacceptable for certain production environments.

To alleviate the problems mentioned above, as well other problems in the art, it would be desirable to provide a microwave powered lamphead which is capable of quickly cycling between active and inactive states, yet also allows proper cooling of the lamp bulb and minimizes the escape of harmful UV radiation.

SUMMARY OF THE INVENTION

The invention generally provides a microwave powered lamp assembly having at least one microwave powered lamp bulb mounted in an optical cavity. A shutter system is provided to selectively open and closed the optical cavity and correspondingly allow and prevent light transmission to a target. A tight seal against light transmission is achieved in the closed position. Thus, the lamp bulb may remain on or powered while the shutter is actuated between a position which allows the transmission of light from the optical cavity and a position which prevents any significant transmission of light from the optical cavity. The shutter can allow much quicker cycling of the lamp between an active or curing state and an inactive or noncuring state. In addition, the material forming the shutter substantially prevents transmission of any light from the optical cavity through that material, but allows unrestricted airflow therethrough. In this manner, cooling air which is traveling past the activated lamp bulb can freely escape from the optical cavity.

The invention further contemplates a method of operating a a microwave powered lamp assembly. Generally, the method comprises activating a magnetron of the microwave powered lamp assembly and exciting plasma in a plasma filled bulb mounted in an optical cavity of the microwave powered lamp assembly. In this manner, UV radiation is emitted from the plasma filled bulb. In accordance with the invention, the optical cavity is selectively opened and closed to allow and prevent transmission of the UV radiation from the optical cavity. Thus, the lamp may be effectively cycled on and off without actually having to supply and cut off power to the lamphead and with cycle times capable of being reduced to one second or less.

These and other objects, advantages, and features of the invention will become more readily apparent from the following detailed description of the preferred embodiment taken in conjunction with the accompanying drawings.

DETAILED DESCRIPTION OF THE DRAWINGS

Figure 1:
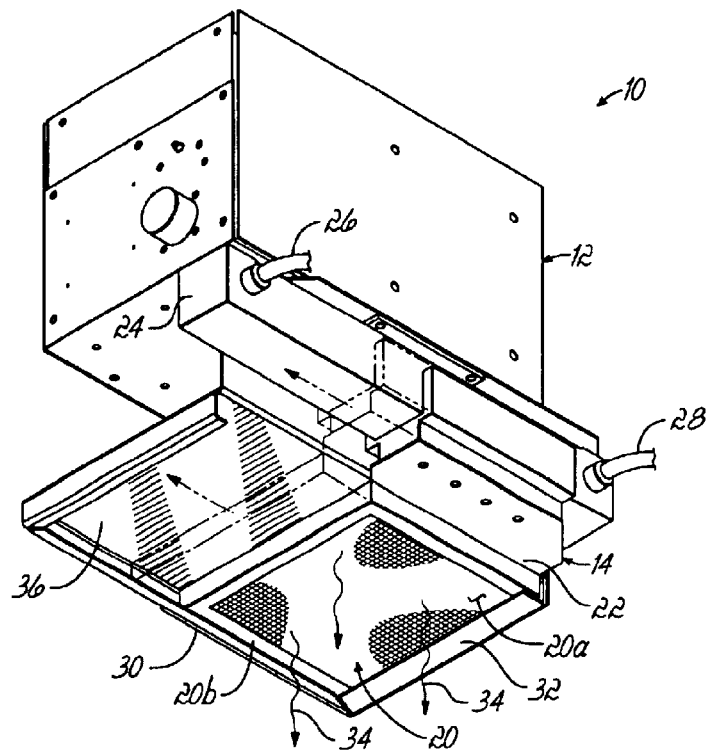
FIG. 1 is a perspective view of a lamphead constructed in accordance with the present invention and showing the shutter assembly in position to obstruct the transmission of light from the optical cavity.
Figure 2:
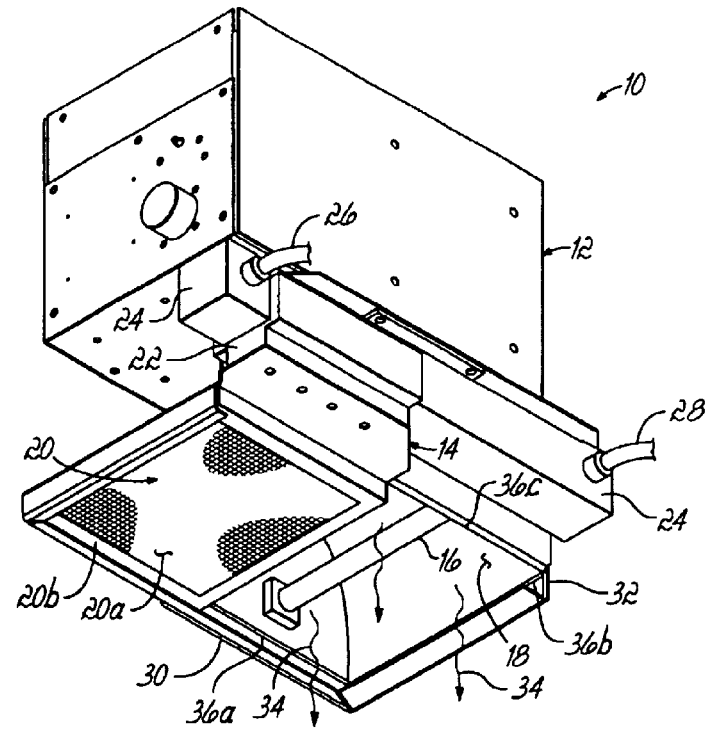
FIG. 2 is a perspective view similar to FIG. 1, but illustrating the shutter assembly moved to a position which allows the transmission of light from the optical cavity.

Referring to FIGS. 1 and 2, a lamphead 10 constructed in accordance with the inventive principles generally comprises a magnetron and control housing 12 coupled with a shutter assembly 14. At least one magnetron (not shown) is operatively associated with a plasma-filled lamp bulb 16 contained in an optical cavity 18. Cavity 18 can have conventional reflector structure, such as an elliptical reflector. The magnetron or magnetrons and other control components contained in housing 12 may be conventional and, therefore, further description of these components is not necessary. Shutter assembly 14 further comprises a shutter 20 formed from a louvre material 20a contained in a suitable outer frame 20b. Louvre material 20a may be obtained from Tuttle and Bailey, located in Richardson, Tex. Frame 20b is coupled to a bracket 22 which, in turn, is operatively coupled to a pneumatic, reciprocating actuator 24. Pneumatic actuator 24 may be a conventional double acting linear actuator which receives positive pressurized air through inputs 26, 28 and also exhausts air through these ports 26, 28 depending on the direction of actuation. It will be appreciated, however, that various types of actuators and other associated structure, as well as various types of shutters, may be used while achieving the advantages of this invention. In the preferred embodiment, a conventional pneumatic actuator, such as actuator 24, may be cycled fast enough to achieve active/inactive (on/off) states in about one second or less. With the lamp bulb 16 remaining excited throughout the production run, and the cycling between active and inactive states being achieved by shutter assembly 14, this enables much faster production in applications such as those involving quick UV curable coatings.

To help ensure that as little UV radiation escapes from optical cavity 18 as possible when shutter assembly 14 is in the closed position shown in FIG. 1, suitable flanges or seals are provided around the perimeter of shutter frame 20*b*. In this preferred embodiment, flanges 30 and 32 may provide at least some light sealing effect in addition to assisting with guidance and stabilization of shutter 20. However, the main light seal is provided between shutter frame 20*b* and undersurface 36. As shown in FIG. 2, undersurface 36 has edges 36*a*, 36*b*, 36*c* which either contact or are very closely spaced with respect to the upper side of shutter frame 20*b*.

While the present invention has been illustrated by a description of a preferred embodiment and while this embodiment has been described in some detail, it is not the intention of the Applicants to restrict or in any way limit the scope of the appended claims to such detail. Additional advantages and modifications will readily appear to those skilled in the art. The various features of the invention may be used alone or in numerous combinations depending on the needs and preferences of the user. This has been a description of the present invention, along with the preferred methods of practicing the present invention as currently known.

However, the invention itself should only be defined by the appended claims.

What is claimed is:

1. A microwave powered lamp assembly comprising:
    a housing structure;
    a magnetron mounted in said housing structure;
    an optical cavity in said housing structure;
    a plasma-filled lamp bulb mounted in said optical cavity and capable of being activated by said magnetron; and
    a shutter mounted for movement relative to said optical cavity between at least two positions to selectively allow transmission of light from said lamp bulb out of said optical cavity or prevent transmission of light from said lamp bulb out of said optical cavity.

2. The lamp assembly of claim 1, further comprising an actuator coupled to said shutter for moving said shutter between said two positions.

3. The lamp assembly of claim 2, wherein said actuator is a pneumatic actuator.

4. The lamp assembly of claim 1, wherein said shutter is comprised of a material which allows unrestricted airflow therethrough but prevents any significant UV radiation transmission therethrough.

5. The lamp assembly of claim 1, wherein said shutter is positioned with a light sealing relationship relative to said optical cavity in the closed position to prevent any significant UV radiation transmission from said optical cavity.

6. A method of operating a microwave powered lamp assembly, comprising:
    activating a magnetron of the microwave powered lamp assembly;
    exciting plasma in a plasma filled bulb mounted in an optical cavity of the microwave powered lamp assembly such that UV radiation is emitted from the plasma filled bulb; and
    selectively opening and closing the optical cavity to allow and prevent transmission of the UV radiation from the optical cavity.

7. The method of claim 6, wherein selectively opening and closing the optical cavity further comprises:
    moving a shutter back and forth across the optical cavity.

8. The method of claim 7, further comprising:
    forcing cooling air through the optical cavity and the shutter to cool the plasma filled bulb.

9. The method of claim 6, wherein closing the optical cavity further comprises:
    sealing the optical cavity from any significant transmission of UV radiation therefrom.

* * * * *